May 30, 1967  C. W. BAIRD  3,323,045
DIELECTRIC MEASURING SYSTEM INCLUDING A CLAMP CIRCUIT
FOR MODIFYING ONE OF TWO DETECTION SIGNALS
Filed Oct. 21, 1963  2 Sheets-Sheet 1
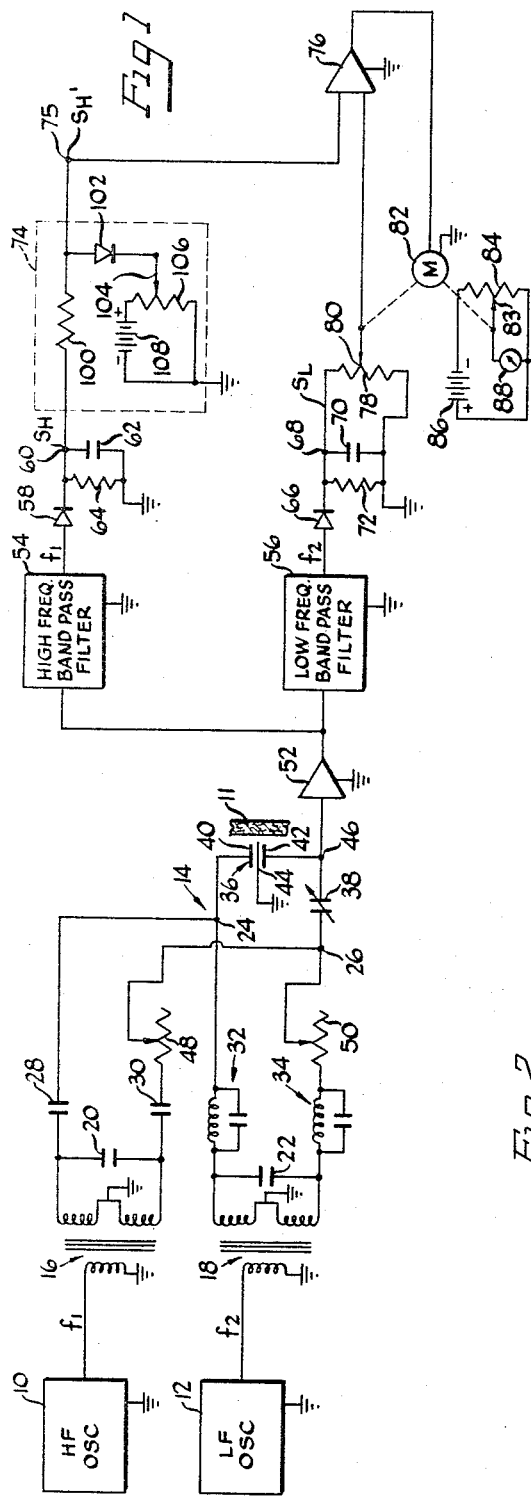
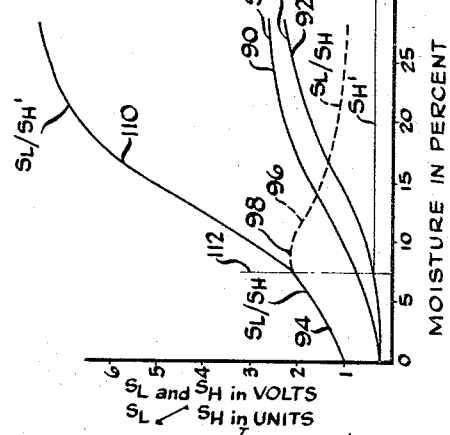
Inventor
Clyde W. Baird
By Anderson, Luedeka, Fitch,
Even & Tabin
Atty's

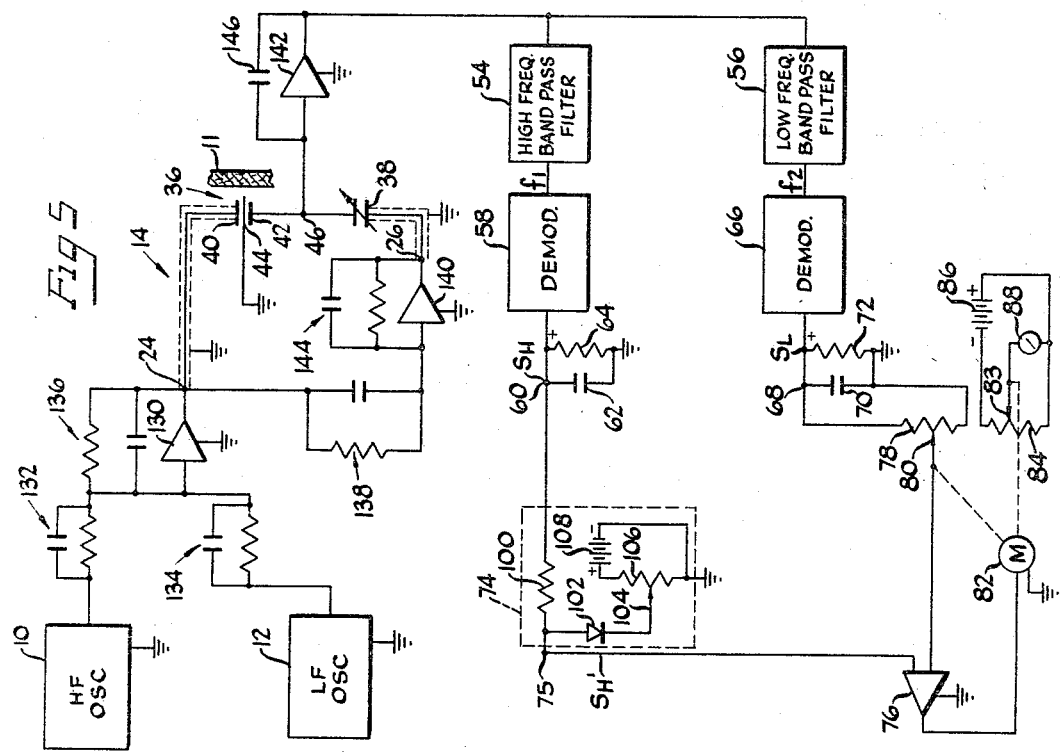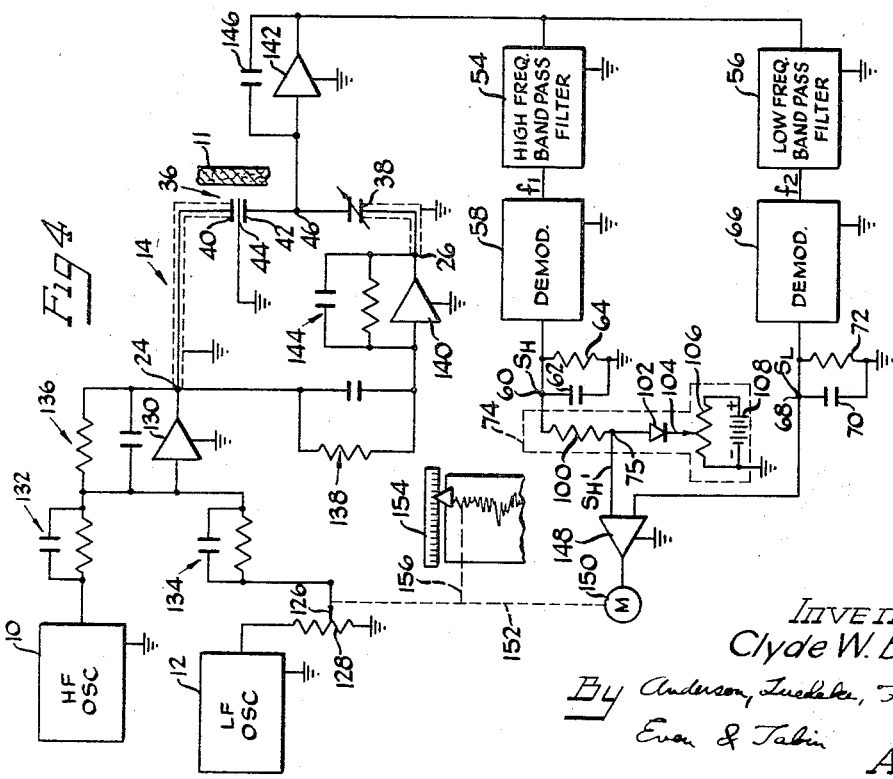

United States Patent Office 3,323,045
Patented May 30, 1967

3,323,045
DIELECTRIC MEASURING SYSTEM INCLUDING A CLAMP CIRCUIT FOR MODIFYING ONE OF TWO DETECTION SIGNALS
Clyde W. Baird, Columbus, Ohio, assignor to Industrial Nucleonics Corporation, a corporation of Ohio
Filed Oct. 21, 1963, Ser. No. 317,706
15 Claims. (Cl. 324—61)

This invention relates generally to a measurement system having a plurality of signals at different frequencies applied to a capacitance probe, particularly to such a system for measuring moisture and more particularly to such a system in which the measurement is dependent upon the ratio of signals at two different frequencies.

The present invention is an improvement over various previously known systems such as disclosed in copending applications Ser. No. 41,975, filed July 11, 1960, for Measuring System by Albert F. G. Hanken, now Patent No. 3,155,900; Ser. No. 57,234, filed Sept. 20, 1960, for Measuring Circuit by Clyde W. Baird, now Patent No. 3,234,460; Ser. No. 259,116, filed Feb. 18, 1963, for Measuring System by Clyde W. Baird, now Patent No. 3,241,062; and Ser. No. 268,268, filed Mar. 29, 1963, for Measuring System by Alan Norwich, now Patent No. 3,290,588. In these earlier systems the capacitance probe forms part of a bridge circuit. The probe includes as a dielectric the material to be measured. The bridge is simultaneously supplied with a pair of signals at two different frequencies in such manner that the capacitance arms of the bridge have balanced voltages at widely displaced frequencies applied at their output terminals. There are produced across the bridge two bridge unbalance signals at the respective frequencies but at respective amplitudes varying in accordance with the unbalance of the bridge at each frequency. The unbalance signals are amplified and applied to a pair of filters, one passing the signal at one frequency to a first detector and the other passing the signal at the other frequency to a second detector. The outputs of the detectors are D.C. signals of magnitudes that vary in accordance with the amplitude of the unbalance signals at the respective frequencies. The two signals from the detectors are then applied to a computer for computing an indication of a property of the capacitance probe, in particular its moisture content.

In these earlier systems, the computer derived a function related to the ratio of the two unbalance signals. A difficulty with these earlier systems was that the ratio of the two signals was not a single valued function of the moisture content of the material being measured. At relatively low moisture levels the ratio increased steadily with moisture. However, at a certain moisture level, the ratio reached a peak and thereafter diminished. In measurements near the peak it was difficult to tell on which side of the peak the measurement was being made, and a particular ratio corresponded to two possible moisture contents.

In the system of the present invention, the detection signal corresponding to the high frequency unbalance is limited or clamped before the peak is reached in the ratio function. This prevents a double valued relationship between the ratio and moisture and provides unequivocal measurements. At moisture contents above the point where the high frequency signal is clamped, the instrument operates as a single frequency moisture system; however, below this point the system operates as a dual frequency moisture system with all of the attendant advantages.

Accordingly, it is a primary object of the present invention to provide a new and improved dual frequency measurement system, most particularly for measuring the moisture content of material.

Another object of the present invention is to provide a dual frequency moisture gauge in which the ratio of the detection signals of the two frequencies is a single valued function of moisture content.

Still another object of the present invention is to provide a dual frequency measurement system in which one of the two detection signals is limited.

A further object of the present invention is to provide a dual frequency measurement system in which means is provided to control at least one of the two detection signals to provide a single valued function for the complete range of the quantity being measured.

Other objects and features of the present invention will become apparent from the following detailed description when taken in conjunction with the drawings in which:

FIGURE 1 is a diagrammatic illustration of one form of the present invention including a limiter for limiting the high frequency detection signal to prevent a double-valued function;

FIGURE 2 shows curves of the operating characteristics of the system of FIGURE 1 both with and without a limiter;

FIGURE 3 is a diagrammatic illustration of a form of the invention utilizing different bridge and bridge excitation circuits;

FIGURE 4 is a diagrammatic illustration of a form of the invention utilizing still other bridge and bridge excitation circuits and in which the ratio of output signals is kept constant by controlling the low frequency input signal; and FIGURE 5 is a diagrammatic illustration of a form of the invention utilizing the bridge excitation circuit shown in FIGURE 4 with the read-out circuit shown in FIGURE 1.

Referring now to the drawings, FIGURE 1 shows a system for measuring the moisture content of material 11, which may be paper, for example. A pair of oscillator generators 10 and 12 are operative to produce a pair of input signals. These input signals are at widely displaced frequencies which are referred to hereinafter as the high and low frequencies $f_1$ and $f_2$, respectively. In certain measurements it has been found convenient and desirable to use frequencies of 500 kilocycles and 100 kilocycles, respectively.

The high and low frequency input signals are applied to a bridge circuit 14 through respective transformers 16 and 18. The center taps of the secondary windings of the respective transformers are grounded. If necessary, a balancing circuit can be used to make certain that the ground is truly in the center of the secondaries. As shown, the secondaries may be shunted by respective capacitors 20 and 22. The high frequency signals may be coupled to opposite terminals 24 and 26 of the bridge circuit 14 through high frequency coupling capacitors 28 and 30. The low frequency signal may be applied to the same terminals 24 and 26 through high frequency rejection traps 32 and 34. The bridge is completed by measuring probe 36 and balancing capacitor 38. The measuring probe may comprise probe electrodes 40 and 42 with a grounded guard electrode 44 therebetween. As shown the measuring probe is basically a fringe field capacitor. It is also possible to utilize a parallel plate capacitor with the material passing between the plates. The output of the bridge is taken between ground and terminal 46 which is the terminal common to probe 36 and capacitor 38.

As is known in the prior art, the bridge is initially balanced at both frequencies with no material at the probe. This is achieved by appropriate adjustment of the balancing capacitor 38. If necessary, phase adjustments can be made by adjusting variable resistors 48 and 50 connected in one side of each of the respective input circuits. When the material is then placed in operative relationship to the probe, the bridge becomes unbalanced at both frequencies and unbalance signals are applied to a detector amplifier 52 wherein both signals are amplified and applied simultaneously to a high frequency band pass filter 54 and a low frequency band pass filter 56. These filters serve to separate the signals at the two frequencies. The filter 54 passes the detection signal at the higher frequency, $f_1$, while filter 56 passes the detection signal at the lower frequency, $f_2$. The detection signal at the higher frequency is then applied to a demodulator 58, which may comprise a diode and serves to derive a D.-C. detection signal at a terminal 60. A capacitor 62 and a resistor 64 may be connected between the terminal 60 and ground as shown. The D.C. signals ($S_H$) thus derived on terminal 60 is thus a measure of the unbalance of the bridge at the higher frequency.

Similarly, the low frequency detection signal passing band pass filter 56 is applied to a low frequency demodulator 66 which derives a D.-C. detection signal ($S_L$) on a terminal 68 which is connected to ground through a capacitor 70 and a resistor 72. The D.C. signal $S_H$ is applied through a limited circuit 74 to a terminal 75 which in turn is connected to the input of a servo amplifier 76. The D.C. detection signal $S_L$ is applied to a ratio computing potentiometer 78 having a movable output tap 80 connected to the servo amplifier 76. The output of the servo amplifier is applied to a servo motor 82 which operates in a conventional manner to drive the movable tap 80 of the ratio computing potentiometer 78 in such direction as to reduce the input to the servo amplifier 76, i.e., to make the input on tap 80 equal to the input at terminal 75. Thus in a conventional manner the balanced position of the ratio computing potentiometer is systematically related to the ratio of the signal on terminal 68 to the signal on terminal 75. This systematic relationship may be direct proportionality. At the same time, the servo motor 82 drives a tap 83 of a moisture read-out potentiometer 84.

A fixed voltage source 86 may be applied between the terminals of the potentiometer 84 and an output signal read on a meter or recorder 88. The potentiometer 84 and meter 88 may be calibrated empirically to read moisture.

In FIGURE 2 there is illustrated curves of signals $S_L$ and $S_H$ as functions of moisture. The curve 90 represents the D.C. detection signal $S_L$ whereas the curve 92 represents the D.C. detection signal $S_H$. The curve 94–96 represents the ratio $S_L/S_H$. As illustrated the curve reaches a peak 98 and then falls with increasing moisture content. Inasmuch as the read-out meter reads the ratio $S_L/S_H$, a given reading corresponds to two different moisture contents and would be unreliable for any system where the moisture varied over wide ranges were it not for the limiter 74.

The limiter or clamp circuit 74 serves to prevent a double-valued function. In the preferred form of the invention illustrated in FIGURE 1, the clamp circuit comprises a series resistor 100 connected between terminals 60 and 75, a clamp diode 102 connected between terminal 75 and a tap 104 on a potentiometer 106. The potentiometer is supplied with voltage from a voltage source 108.

The resistance of resistor 100 is such that it does not materially affect the normal operation of the measuring system when the clamp circuit is not limiting the signal on terminal 75. The voltage source 108 supplies positive voltage to the potentiometer 106 and an appropriate part of this voltage is picked off on the tap 104. The diode 102 is connected to pass current whenever the voltage on terminal 75 exceeds the voltage on tap 104. The voltage terminal 75 therefore is not permitted to rise substantially above the voltage at which tap 104 is set. However, when the voltage on tap 104 exceeds the voltage on terminal 75, only a very small leakage current flows through the diode 102 and the limiter 74 acts as though it were not present. The bias on the diode, that is the voltage on tap 104, is adjusted by movement of the tap so that the diode 102 conducts at a selected point on the curve, i.e., at a selected value of $S_H$. For example, as shown in FIGURE 2, this value may be at a voltage $S_H'$ corresponding to about 7.5% moisture. When the diode conducts, the voltage at terminal 75 is clamped at the value $S_H'$. This limits the voltage on terminal 75 so that it does not exceed the predetermined fixed voltage level $S_H'$. The servo system then operates to derive the signal $S_L/S_H'$. This ratio may take the form illustrated by curve 110. As can be seen, this curve is single valued and provides a determination of moisture for each deflection of the meter 88. There is, of course, a discontinuity in the function at the line 112 which marks the point where the limiter clamps. Above this line, the meter 88 reads the function $S_L/S_H'$, whereas below this line the meter 88 reads the function, $S_L/S_H$.

Thus, curve 94 represents the reading on the meter 88 and represents $S_L/S_H$ irrespective of the presence of the limiter 74. Above the clamping point, the meter reads $S_L/S_H'$ represented by curve 110 whereas in absence of the limiting action it would have read in accordance with curve 96. Owing to the presence of the limiter, the meter 88 reads a single valued function, albeit discontinuous at the line 112. Below the line 112, the system functions like the dual frequency systems previously known and has all the advantages attendant thereto. Above the line 112, the system functions essentially as a single frequency system but has the advantage over the prior two frequency systems of being single valued. It thus serves to extend the useful range of the measuring system to higher moisture content. Although it is not so independent of mass variations and hence is not so reliable as the dual frequency part of the system operating at low moisture contents, the single frequency part of the system operating at high moisture contents is generally satisfactory for it is generally not necessary to have such accurate measurements at high moisture contents anyway. Often, only the low moisture contents are of interest in the process or product being measured or controlled, higher moisture contents being reached only when something is awry. In these instances, it is satisfactory if the meter merely indicates that moisture content is above the point indicated by the line 112 and does not have a downscale reading at the higher moisture contents. In such circumstances accuracy above line 112 is of no consequence, it being only necessary to limit the signal $S_H'$ to prevent the double-valued function.

In FIGURE 3 is illustrated the applicability of the invention to the system shown in Hanken application Ser. No. 41,975. The system of FIGURE 3 is similar to that of FIGURE 1, but has modified bridge and bridge excitation circuits. The two oscillators 10 and 12 supply input signals to separate primary windings 114 and 116 of transformer 118. The secondary 120 of the transformer has its center tap grounded and applies voltage as in the system shown in FIGURE 1 between terminals 24 and 26 of the bridge 14. Phase shift is adjusted by a phase shift circuit 122. The limiter 74 is connected to the output of the detector 58 and serves to apply a signal to a computer 124 which may function as the servo system and ratio computing potentiometer of the system of FIGURE 1 to provide a reading on meter 88 indicative of moisture content. By the circuit explained more fully in the aforesaid Hanken application, it may equally derive the function $$\frac{S_L - S_H'}{S_H'}$$

which is equivalent to $(S_L/S_H') - 1$. The limiting circuit 74 serves exactly the same function in the apparatus of FIGURE 1 as in the apparatus of FIGURE 3.

The present invention is also applicable to systems like that described in the aforesaid Baird application Ser. No. 259,116 where the ratio $S_L/S_H$ is not directly determined but wherein an equivalent function is derived by modifying the output of the low frequency oscillator to maintain the ratio of detection signals constant, preferably at unity.

As shown in FIGURE 4, the output of the low frequency oscillator 12 is taken from a tap 126 on a potentiometer or voltage divider 128 in order that the magnitude of the signal therefrom can be varied by variation of the potentiometer setting. Except where the context indicates otherwise, the output signal of low frequency oscillator 12 will be considered herein as the signal appearing at tap 126. The signals are applied to an A.C. feedback amplifier 130 through respective input impedances 132 and 134.

Amplifier 130 is capable of amplifying both frequencies and does not include tuned elements. In this way the amplifier 130 can accommodate any frequency within a given range without requiring bridge adjustments. The voltage capability of the amplifier 130 must be the peak to peak voltage swing of the low frequency signal required by the bridge plus the peak to peak voltage swing of the high frequency signal. This amplifier, although capable of high gain, is preferred to be operated at a gain of unity with feedback. Feedback is by means of impedance 136 and provides a low output impedance and good gain stability. The amplifier 130 is preferably used as a type of A.C. summing amplifier. In this way the two frequencies may be fed simultaneously to the bridge without frequency acceptor or rejector circuits that would normally be required to prevent one frequency source from loading the other. In the preferred form of this invention, impedances 132, 134 and 136 are like, although not necessarily of equal value; the signals at the output of amplifier 130 are then of opposite phase from the output signals from oscillators 10 and 12, and are equal to the sum of the oscillator signals each divided by the ratio of the respective input impedances 132 or 134 to the feedback impedance 136.

The combined signals from amplifier 130 are applied to input terminal 24 of the bridge 14 which is connected to the plate 40 of the capacitance probe 36. The probe 36 preferably comprises a fringe field capacitor as in the system of FIGURE 1, having a second plate 42 and a grounded guard electrode 44 between the plates. The material 11 being measured forms a part of the dielectric of the capacitance probe 36.

The combined signals, in addition to being fed to the capacitance probe 36, are also fed through input impedance 138 into a phase inverter amplifier 140. This provides combined signals of phase opposite to the combined signals applied to the capacitance probe 36. The combined signals of opposite phase are applied to the second input terminal 26 of the bridge 14 which is connected to the balancing capacitor 38. At each frequency a signal of one phase is applied between ground (as a reference datum) and terminal 24 and a signal of opposite phase is applied between ground and terminal 26. The output of the bridge circuit is taken between measuring terminal 46 and ground and is applied to output amplifier 142.

The amplifier 140 is preferably like amplifier 130 and has a similar feedback impedance 144; preferably impedances 138 and 144 are identical. The output of amplifier 140 will then be equal to the input to impedance 138 but of opposite phase. The signals applied to the bridge terminals 24 and 26 are therefore equal and opposite. Balancing capacitor 38 is adjusted to equal the capacitance of probe 36 when material 11 is absent from the probe, and the bridge is then balanced at both frequencies as may be observed at the measuring terminal 46.

The bridge may also be balanced at other values of balancing capacitor 38 by changing the relative magnitude of impedances 138 and 144. That is, if the impedance of impedance 144 is, for example, three times that of impedance 138, the phase inverter steps the signal down by a factor of three. Balance may then be achieved by making the balancing capacitor 38 three times larger. In either case, with the bridge balanced, any change in the output of amplifier 130, as may be occasioned by changes in the amplifier or its output from oscillators 10 and 12, will result in a balancing change in the oppositely phased output of amplifier 140. Thus, the bridge automatically remains at a given balance.

Although impedances 138 and 144 are shown as parallel capacitors and resistors, they may also be pure capacitors or resistors. The important criterion is that both of the impedances be like. They need not be equal, but they should introduce substantially the same phase shift at each frequency. The current through the input impedance 138 flows through the feedback impedance 144 with no current flowing into the amplifier itself. In this case, if the impedances are like, the voltage at the output of the amplifier is of phase opposite to that of the input voltage but of magnitude equal to the input voltage divided by the ratio of the input impedance to the feedback impedance. This ratio should be real at all frequencies; that is, the feedback impedance should be substantially like the input impedances, although its magnitude may be greater or smaller, in order that it not introduce appreciable phase shift in addition to the 180° phase shift of the amplifier 140. As used herein, like does not necessarily imply the same magnitude.

As an illustration of the operation of this system, moisture measurement is considered. With the bridge balanced as above and with equal signals applied at each frequency, when the material 11 contains no moisture, the high frequency signal developed at terminal 46 will be of the same amplitude as the low frequency signal. If moisture were to be introduced into the material 11, the low frequency signal would increase more than the high frequency signal. However, if only the mass of the material were to be increased, both the high and the low frequency signals would increase, but the ratio of the one signal to the other would remain constant.

The signals of both frequencies developed at terminal 46 are applied to the amplifier 142 which may have a feedback loop through a capacitor 146. The output amplifier 142 acts as an A.C. summing amplifier and applies the combined signals to high and low frequency filters 54 and 56, respectively, if necessary, with additional amplification. As in the system shown in FIGURE 1, these filters 54 and 56 separate the high frequency signal from the low frequency signal and apply the separate signals to demodulators 58 and 66 respectively, which derive separate D.C. signals $S_H$ and $S_L$ on respective terminals 60 and 68, each signal corresponding to a respective one of said high and low frequency signals appearing at terminal 46. In the system shown in the aforesaid Baird application, Ser. No. 259,116, the ratio $S_L/S_H$ is not measured directly but by a servo system that maintains this ratio constant, preferably at unity. The output circuits of the demodulators, including respective resistors 64 and 72 and respective capacitors 62 and 70, could be adjusted to provide different gain for the two signals and hence a different constant ratio could be maintained, but it is preferred that the gains be the same and the ratio maintained at unity.

In accordance with the present invention the signal $S_H$ on terminal 60 is applied to the limiter circuit 74 which, as described above, limits the signal output $S_H'$ on terminal 75. It is then the ratio of signals $S_L/S_H'$ which is kept at unity. To achieve this, the outputs of the demodulators may be applied to a servo amplifier 148, which acts in a conventional manner to produce an output of amplitude and polarity dependent upon the difference between the two D.C. signals, i.e., $S_L - S_H'$. The output of amplifier 148 drives servo motor 150 which mechanically through linking means 152 (which may be a shaft) moves the tap 126 to vary the output of the low frequency oscillator 12. Depending upon whether the low frequency signal $S_L$ is less than or greater than the high frequency signal $S_H'$, the polarity of the output of servo amplifier 148 is such as to cause the motor 150 to rotate so as to move the tap 126 up or down, respectively, thus increasing or decreasing the output of low frequency oscillator 12 as necessary to reduce the difference between the two D.C. signals. So long as the two signals are different, the tap is moved. When the two signals are equal, the servo system is balanced, and the tap 126 is at that point on the slidewire that provides the appropriate amplitude of the output of the low frequency oscillator to produce this balance. The position of the tap is indicative of this output and is likewise indicative of moisture, as will now be shown.

As in the case of the system shown in FIGURE 1, the ratio of $S_L$ to $S_H'$ is indicative of the moisture content of the material being measured. In the system of FIGURE 1, the outputs of the two oscillators were of equal amplitude. Were the output of the low frequency oscillator to be doubled, the ratio of $S_L$ to $S_H'$ would be doubled. Hence, if the moisture content of the material were to change so as to cause the ratio of $S_L$ to $S_H'$ to change from unity to two, the output of oscillator 12 could be reduced by a factor of two to return the ratio to unity. This is automatically done by the system of FIGURE 4, and the position of the tap 126 is the reciprocal of the ratio of $S_L$ to $S_H'$ that would have existed had the oscillator had the same output, as in the system of FIGURE 1. A read-out device 154 may be coupled to the tap by linkage means 156 so as to read out the tap position and hence moisture content. The particular relationship between tap position and the read-out scale is determined by the particular manner in which the potentiometer 128 is wound. The system can thus be calibrated to read-out moisture content directly. Just as in the case of the system shown in FIGURE 1, the limiting circuit 74 prevents a double-valued function by limiting the D.C. detection signal corresponding to unbalance of the bridge at the high frequency.

A further modification of the invention is shown in FIGURE 5 wherein the bridge and bridge excitation circuit shown in FIGURE 4 is used with the computer and read-out circuit shown in FIGURE 1. The system functions as described above in connection with the explanation of the circuits shown in FIGURES 1 and 4 and the limiter 74 operates in the same manner as in the circuit shown in FIGURE 1.

That is, rather than utilizing the difference between $S_H'$ and $S_L$ as the signals indicative thereof appear on terminals 75 and 68, respectively, and using this difference to control the low frequency signal from low frequency oscillator 12, instead their ratio is computed by ratio computing potentiometer 78 and read out on meter 88.

Although certain specific embodiments have been described herein, modifications may be made thereto without departing from the true spirit and scope of the invention as set forth in the appended claims. For example, it should be noted that although the probe is called a capacitance probe, the dielectric constant of the material being measured may have an imaginary, i.e., resistive, component, and the probe electrodes need not be insulated from the material being measured. The invention also has applicability to a system where the frequency rather than the amplitude of the low frequency oscillator is varied to maintain the ratio $S_L/S_H'$ constant, and that frequency is measured as an indication of moisture content. Such a system, but without the limiter of the present invention, is described in copending application Ser. No. 107,794, filed May 4, 1961, for Measuring System by Albert F. G. Hanken, now Patent No. 3,155,901. It may also be noted that the limiter 74 serves to prevent erroneous measurements occasioned by overload or saturation of either or both of the demodulators at high moisture contents. For example, it serves to prevent the ratio $S_L/S_H'$ from reversing even though the low frequency signal $S_L$ reaches a maximum because of such saturation.

What is claimed is:

1. A system for determining a property of a dielectric material comprising: a measuring probe having spaced electrodes for coupling said probe to said material, first signal generating means for generating a high frequency signal, second signal generating means for generating a low frequency signal, means connected to said first and second signal generating means for coupling said high and low frequency signals to said measuring probe, means coupled to said measuring probe for deriving a first detection signal related to signals from said probe occasioned by said material at said high frequency and a second detection signal related to signals from said probe occasioned by said material at said low frequency, non-linear means for modifying at least one of said first and second detection signals, and means responsive to said first and second detection signals for comparing said signals to derive an indication of said property of said dielectric material, said last named means being responsive to at least one of said first and second signals as modified by said non-linear means.

2. A system for determining a property of a dielectric material comprising: a measuring probe having spaced electrodes for coupling said probe to said material, first signal generating means for generating a high frequency signal, second signal generating means for generating a low frequency signal, means connected to said first and second signal generating means for coupling said high and low frequency signals to said measuring probe, means coupled to said measuring probe for deriving a first detection signal related to signals from said probe occasioned by said material at said high frequency and a second detection signal related to signals from said probe occasioned by said material at said low frequency, non-linear means for modifying one of said first and second detection signals, and means responsive to said one signal as modified and to the other of said first and second detection signals for comparing said signals to derive an indication of said property of said dielectric material.

3. A system for determining the moisture content of a dielectric material comprising: a measuring probe having spaced electrodes for coupling said probe to said material, first signal generating means for generating a high frequency signal, second signal generating means for generating a low frequency signal, means connected to said first and second signal generating means for coupling said high and low frequency signals to said measuring probe, means coupled to said measuring probe for deriving a first detection signal related to signals from said probe occasioned by said material at said high frequency and a second detection signal related to signals from said probe occasioned by said material at said low frequency, and combining means responsive to said first and second detection signals for combining said signals to derive indication of their ratio as a measure of said moisture content of said dielectric material, said combining means including non-linear means for limiting the amplitude of said first detection signal to limit said ratio to a single-valued function of moisture content for all moisture contents.

4. A system for determining the moisture content of a dielectric material comprising: a measuring probe having spaced electrodes for coupling said probe to said material, first signal generating means for generating a high frequency signal, second signal generating means for generating a low frequency signal, means connected to said first and second signal generating means for coupling said high and low frequency signals to said measuring probe, means coupled to said measuring probe for deriving a first detection signal related to signals from said probe occasioned by said material at said high frequency and a second detection signal related to signals from said probe occasioned by said material at said low frequency, and means responsive to said first and second detection signals for comparing said signals to derive an indication of said moisture content of said dielectric material, said last named means including non-linear means for modifying at least one of said first and second detection signals before their comparison to limit said indication of said moisture content to a single-valued function for all moisture contents.

5. A system for determining a property of a dielectric material comprising: a measuring probe having spaced electrodes for coupling said probe to said material, first signal generating means for generating a high frequency signal, second signal generating means for generating a low frequency signal, means connected to said first and second signal generating means for coupling said high and low frequency signals to said measuring probe, detector means coupled to said measuring probe for deriving a first detection signal related to signals from said probe occasioned by said material at said high frequency and a second detection signal related to signals from said probe occasioned by said material at said low frequency, non-linear means coupled to said detector means for limiting said first detection signal, and means responsive to said first detection signal as so limited and to said second detection signal for comparing said signals to derive an indication of said property of said dielectric material.

6. A system for determining the moisture content of a dielectric material comprising: a measuring probe having spaced electrodes for coupling said probe to said material, first signal generating means for generating a high frequency signal, second signal generating means for generating a low frequency signal, means connected to said first and second signal generating means for coupling said high and low frequency signals to said measuring probe, detector means coupled to said measuring probe for deriving a first detection signal related to signals from said probe occasional by said material at said high frequency and a second detection signal related to signals from said probe occasioned by said material at said low frequency, a diode clamp circuit coupled to said detector means and clamping said first detection signal substantially to a fixed predetermined amplitude whenever it reaches said amplitude, and means responsive to said first and second detection signals for comparing said signals as an indication of said moisture content of said dielectric material.

7. Apparatus for quantitative determination of at least one property of a dielectric material by measurement of a function of the dielectric properties of said material, said apparatus comprising a plurality of sources of electrical signals at different respective frequencies, detecting means, and capacitive probe means having spaced electrodes arranged for applying electrical signals from said sources to at least a portion of said material and at the same time coupling said detecting means to said portion, said detecting means including means for deriving separate signals each resulting from the signals applied from a respective source as these applied signals are influenced by the mass of said material and the dielectric properties of said material at the frequency of that source, non-linear means for modifying at least one of said separate signals, and means for combining said separate signals as modified to produce a continuous resultant signal that is a function of the ratio of said separate signals as modified as an indication of said property of said dielectric material.

8. Apparatus for quantitative determination of the moisture content of a dielectric material by measurement of a function of the dielectric properties of said material, said apparatus comprising first and second sources of electrical signals at high and low frequencies, respectively, detecting means, and capacitive probe means having spaced electrodes arranged for applying electrical signals from said sources to at least a portion of said material and at the same time coupling said detecting means to said portion, said detecting means including means for deriving first and second detection signals each resulting from the signals applied from a respective one of said first and second sources as these applied signals are influenced by the mass of said material and the dielectric properties of said material at the frequency of that source, a diode clamp circuit clamping said detection signal related to said high frequency substantially to a fixed predetermined amplitude whenever said detection signal reaches said amplitude, and means for combining said detection signals to produce a continuous resultant signal that is a function of the ratio of said detection signals as an indication of said moisture content of said dielectric material.

9. Apparatus for quantitative determination of at least one property of a dielectric material by measurement of a function of the dielectric properties of said material, said apparatus comprising first and second sources of electrical signals at high and low frequencies, respectively, detecting means, and capacitive probe means having spaced electrodes arranged for applying electrical signals from said sources to at least a portion of said material and at the same time coupling said detecting means to said portion, said detecting means including means for deriving first and second detection signals each resulting from the signals applied from a respective one of said first and second sources as these applied signals are influenced by the mass of said material and the dielectric properties of said material at the frequency of that source, a limiter circuit limiting said detection signal related to said high frequency substantially to a fixed predetermined amplitude whenever said detection signal reaches said amplitude, and means for comparing said first and second signals to produce a continuous resultant signal that is quantitatively indicative of said property, said apparatus further including a capacitor connected in circuit with said probe means to balance out from said first and second signals any signals developed in the absence of said material at said probe means, whereby said first and second signals include substantially only the change occasioned by the introduction of said dielectric material to said probe means.

10. Apparatus for quantitative determination of the moisture content of a dielectric material by measurement of a function of the dielectric properties of said material, said apparatus comprising first and second sources of electrical signals at high and low frequencies, respectively, detecting means, and capacitive probe means having spaced electrodes arranged for applying electrical signals from said sources to at least a portion of said material and at the same time coupling said detecting means to said portion, said detecting means including means for deriving first and second detection signals each resulting from the signals applied from a respective one of said first and second sources as these applied signals are influenced by the mass of said material and the dielectric properties of said material at the frequency of that source, a limiter circuit limiting said detection signal related to said high frequency substantially to a fixed predetermined amplitude whenever said detection signal reaches said amplitude, means for combining said detection signals to produce a continuous resultant signal that is a function of the ratio of said separate signals, means responsive to said resultant signal for varying the amplitude of the output of one of said second source of electrical signals in such direction as to maintain said ratio constant at unity, and means for indicating the amplitude of said output of said second source of electrical signals as an indication of said moisture content of said dielectric material.

11. A method for the quantitative determination of the moisture content of a dielectric material by measuring a function of the dielectric properties of said material, said method comprising applying electrical signals at two different frequencies to at least a portion of the material, deriving separate signals each resulting from the signals applied at a respective frequency as these applied signals are influenced by the mass of said material and the dielectric properties of said material at that frequency, combining said separate signals to produce a continuous resultant signal that is a function of the ratio of said separate signals and quantitatively indicative of said moisture content, and modifying at least one of said separate signals prior to said combining to make the indication of said moisture content a single-valued function of said ratio for all moisture contents.

12. A method for the quantitative determination of at least one property of a dielectric material by measuring a function of the dielectric properties of said material, said method comprising applying electrical signals at two different frequencies to at least a portion of the material, deriving two separate detection signals each resulting from the signals applied at a respective frequency as these applied signals are influenced by the mass of said material and the dielectric properties of said material at that frequency, limiting said detection signal related to the higher of said frequencies substantially to a fixed predetermined amplitude whenever said detection signal reaches said amplitude, and combining said detection signals to produce a continuous resultant signal that is a function of the ratio of said detection signals and quantitatively indicative of said property.

13. A method for quantitatively determining at least one property of a dielectric material under test by measuring a function of the dielectric properties of said material, said method comprising passing said material continuously through a test region, applying electrical signals at two different frequencies to the material in said region, deriving two separate detection signals each systematically related to the difference between the voltage developed between electrodes coupled together by said material in said region at a respective frequency and the voltage developed between said electrodes in the absence of said material, limiting said detection signal related to the higher of said frequencies substantially to a fixed predetermined amplitude whenever said detection signal reaches said amplitude, and combining said detection signals to produce a continuous resultant signal that is a function of the ratio of said detection signals and quantitatively indicative of said property.

14. A method for quantitatively determining the moisture content of a dielectric material under test by measuring a function of the dielectric properties of said material, said method comprising passing said material continuously through a test region, applying electrical signals at two different frequencies to the material in said region, deriving two separate D.C. detection signals each systematically related to the difference between the A.C. voltage developed between electrodes coupled together by said material in said region at a respective frequency and the A.C. voltage developed between said electrodes in the absence of said material, limiting said detection signal related to the higher of said frequencies substantially to a fixed predetermined amplitude whenever said detection signal reaches said amplitude, and combining said detection signals to produce a continuous resultant signal that is a function of the ratio of said detection signals and quantitatively indicative of said moisture content.

15. A system for determining the moisture content of a dielectric material comprising: a measuring probe having spaced electrodes for coupling said probe to said material, first signal generating means for generating a high frequency signal, second signal generating means for generating a low frequency signal, means connected to said first and second signal generating means for coupling said high and low frequency signals to said measuring probe, means coupled to said measuring probe for deriving a first D.C. detection signal related to A.C. signals from said probe occasioned by said material at said high frequency and a second D.C. detection signal related to A.C. signals from said probe occasioned by said material at said low frequency, and combining means responsive to said first and second D.C. detection signals for combining said signals to derive indication of their ratio as a measure of said moisture content of said dielectric material, said combining means including non-linear means for limiting the amplitude of said first D.C. detection signal to limit said ratio to a single-valued function of moisture content for all moisture contents.

References Cited
UNITED STATES PATENTS

| | | | |
|---|---|---|---|
| 3,155,900 | 11/1964 | Hanken | 324—61 |
| 3,155,901 | 11/1964 | Hanken | 324—61 |
| 3,234,460 | 2/1966 | Baird | 324—61 |
| 3,241,062 | 3/1966 | Baird | 324—61 |
| 3,290,588 | 12/1966 | Norwich | 324—61 |

WALTER L. CARLSON, *Primary Examiner.*

EDWARD E. KUBASIEWICZ, *Examiner.*